United States Patent
Eskildsen et al.

(10) Patent No.: US 6,288,374 B1
(45) Date of Patent: *Sep. 11, 2001

(54) COIL AND CORE STRUCTURE FOR AN INDUCTION COOKTOP

(75) Inventors: Christian Eskildsen, Gelsted; Keld Christensen, Fredericia; Bent Alvsten, Aalborg, all of (DK)

(73) Assignee: A/S Ernst Voss Fabrik, Fredericia (DK)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/387,864
(22) PCT Filed: Aug. 24, 1993
(86) PCT No.: PCT/DK93/00275
 § 371 Date: Jul. 13, 1995
 § 102(e) Date: Jul. 13, 1995
(87) PCT Pub. No.: WO94/05137
 PCT Pub. Date: Mar. 3, 1994

(30) Foreign Application Priority Data

Aug. 24, 1992 (DK) .................................................. 1051/92

(51) Int. Cl.⁷ ...................................................... H05B 6/12
(52) U.S. Cl. ......................... 219/621; 219/622; 219/624; 219/675

(58) Field of Search ..................................... 219/622, 624, 219/626, 625, 627, 621, 620, 663, 675, 676

(56) References Cited

U.S. PATENT DOCUMENTS

| | | | |
|---|---|---|---|
| 2,497,753 | * | 2/1950 | Arnot ................................... 219/626 |
| 3,980,858 | * | 9/1976 | Hibino ................................. 219/624 |
| 4,029,926 | * | 6/1977 | Austin ................................. 219/624 |
| 4,319,109 | * | 3/1982 | Bowles ................................ 219/626 |
| 4,456,807 | * | 6/1984 | Ogino et al. ........................ 219/626 |
| 4,467,162 | * | 8/1984 | Kondo et al. ....................... 219/624 |
| 5,053,593 | * | 10/1991 | Iguchi ................................. 219/624 |
| 5,369,249 | * | 11/1994 | Kwon ................................. 219/624 |

FOREIGN PATENT DOCUMENTS 677 405 * 6/1939 (DE) .................................... 219/624

* cited by examiner

Primary Examiner—Philip H. Leung
(74) Attorney, Agent, or Firm—Antonelli, Terry, Stout & Kraus, LLP

(57) ABSTRACT

Cooking ranges using heating by eddy currents caused by induction of high frequency energy are known, but they have losses caused by leakage fields. The invention provides heating unit in which the magnet coils are integrated into magnetic circuit where the field is collected due to the disposition of the core. A preferred embodiment utilizes magnetic concrete for core parts with chambers for the coils. There may advantageously be cast a covering layer which is thin and wear resistant but still strong, because it is everywhere supported by the material.

11 Claims, 3 Drawing Sheets

COIL AND CORE STRUCTURE FOR AN INDUCTION COOKTOP

TECHNICAL FIELD

The invention concerns an apparatus for the heating of cooking vessels for food by means of high frequency energy, also termed an induction heating cooker.

BACKGROUND AND SUMMARY OF INVENTION

For heating and cooking of food in pots and frying on pans many different heat sources are used, e.g. burning gas, incandescent spirals which may be built into steel plates or give off heat radiation, comprising halogen lamps, the light radiation of which is reflected from below against the bottom of the cooking pot. It is desired to have a source of heat which may be regulated as quickly as possible in order to obtain the most direct influence on the heating of the content in function of the instantaneous energy supply.

It has become common to supply the top of a hotplate or an assembly of hotplates with a coating which will endure the sliding of pots along its surface as well as resisting strong cleansing agents and consequently heat resistant glass is often used. The strong cleansing agents are necessary because a large part of the surface of an assembly becomes so hot that spilt food burns on easily. Furthermore it is essential that the sheet of glass has a considerable thickness because it must resist the sudden placement of heavy pots on the hotplate. The glass plate itself is carried by heavy brackets.

It has become usual to require that a unit for heating food shall have a low profile and a low temperature on the outside of the enclosure because the cooking range and oven are installed independently of each other and are built-in in separate locations. Furthermore it has become more and more common to use electronics for control of power and such electronic components are not durable at too elevated temperatures.

For industrial use induction heating is known in which the primary of a transformer is supplied with high frequency energy from a generator or transmitter and where the secondary wholly or in part consists of metal in a crucible. Since the content of the crucible is almost solid most of the high frequency energy will be dispersed as current losses by the eddy currents generated in the contents of the crucible which cannot run without the generation of heat because of the resistivity of the material. The penetration depth in the crucible is a.o. dependent on the frequency. When the term high frequency energy is used in this text it means energy transmitted at a frequency which exceeds ordinary power frequencies, in particular ultrasonic frequencies, i.e., above 20 kHz, however below 200 kHz.

It has proven advantageous to use the principles of induction heating for hotplates because the self-heating of the surface of such a hotplate may be very small. This is because ideally all of the energy is dispersed as eddy current losses in the bottom of the pot. The pot must have the double function of being ferromagnetic so that the lines of force are drawn into it and resistive so that the eddy currents will disperse energy. An iron cooking pot will fulfil this purpose well, but a copper pot would not. Magnetic lines of force which are not concentrated and will hence not traverse the bottom of the pot must be regarded as losses and standards for allowable radiation of electromagnetic energy request shielding of the magnetic field. Consequently it is usual to fit a network of a material which is highly magnetically conductive at the particular frequency below the field coil in order that the lines of force are as much as possible held between the magnetic shielding and the bottom of the cooking pot. Importantly it is also obtained that the sensitive electronic components are not subjected to the high frequency radiation. The network may be shaped as radial spokes of ferrite material.

It has been considered that such induction heating hotplates may advantageously be used in constructions using a thick, heat resistant sheet of glass as a top plate, because the magnetic lines of force may easily traverse air and glass.

However known induction heating hotplates have the disadvantage that the losses are too high which is displayed by a too high self-heating and the need for more expensive electronic components for the generation of the required high frequency energy. The mechanism is the following: in order to obtain a desired power in the pot energy must be transferred to overcome current losses in the coil and loss of density of magnetic lines of force at airgaps. Hence the current through the coil must be increased, and the heating of the enclosure is further increased. The network of magnetically conductive material used for increasing the field concentration is expensive because it is made of ferrite due to the high frequency. Ferrite is a composite of different metal oxides, among which a ferrous oxide, which has been sintered in an inert gas.

A consequence of the disadvantage discussed is that in known cooking ranges using a number of induction heating hotplates the different coils are inductively coupled with each other which may mean that under certain circumstances one may only be able to use one of the induction heating hotplates at a time.

A further disadvantage of the known induction hotplates is that the windings of the coils transmit ultrasonic energy at the driving frequency or its harmonics because of mechanical vibrations, and it may be perceived by house pets although humans remain unaffected.

It is a purpose of the invention to provide an induction heating hotplate which has considerably higher efficiency than known induction heating hotplates and hence much lower losses and radiation. This is obtained according to the invention in that the magnetic circuit is built like a transformer with a small airgap in which the cooking vessel acts as a yoke. When present text uses the expression airgap any interruption of the magnetic lines force is meant, where they h in non-magnetic material.

The apparatus for the heating of cooking vessels for food by means of electromagnetic induction according to a disclosed embodiment comprises a magnetic circuit constructed with a plate upon which is fitted a central pole piece and an outer ring in the same level above the plate, which parts are made in a material having low magnetic losses or eddy current losses at the frequency utilized. The coil is fitted into the ring-shaped space between the central pole piece and the outer ring.

A further feature of the invention enables simple facilities for changes in the supplied power in that one or several rings are fitted between the central pole piece and the outer ring and in that there is a coil in each space between rings.

It is a further purpose of the invention to provide a construction which is massively built in order that the wear resistant top layer may be quite thin. This is obtained by manufacturing all parts except the source of high frequency energy and the coil in one piece as an integrated block.

An advantageous fixation of the coil in the core is provided in that the coil is cast into the winding space into which it is fitted.

An advantageous material for a hotplate according to the invention is provided in that all parts, except the source of high frequency energy and the coil are manufactured in materials which are dimensionally stable and which are able to be cast.

A further advantageous combination of materials is provided according to the invention in that the magnetic circuit is made up of magnetic concrete and the support for the cooking vessel is cast-on of non-magnetic concrete, preferably of a DSP type.

A further advantageous and useful combination of materials is provided in that the support for the cooking vessel has a low thermic conductivity.

A construction is provided according to the invention which enables a pot dimension dependent supply of power to the pot while utilizing the transformer type construction. In this construction, the coils are combined and supplied with energy in dependence of the diameter of the bottom of the cooking vessel.

There is provided a prescription for the operation of the hotplate which allows electronic measurement of the pot dimension. Particularly, the apparatus has a mode of operation for supplying of power to a cooking vessel and another mode of operation with reduced power supply to the coils for measuring the degree of coupling between the cooking vessel and the magnetic core.

A further advantageous embodiment of the invention is provided for control in dependence of the pot and its placement in that in the measuring mode of operation the coils are connected in rotation in different combinations, and in that the output signal which constitutes an expression of the impedance which is determined by the diameter and placement of the cooking pot controls the combination of coils which is to be supplied with energy from the source of high frequency energy in the subsequent power transfer.

The invention will be described in greater detail in the following with reference to the drawing, where

DETAILED DESCRIPTION

Figure 1:
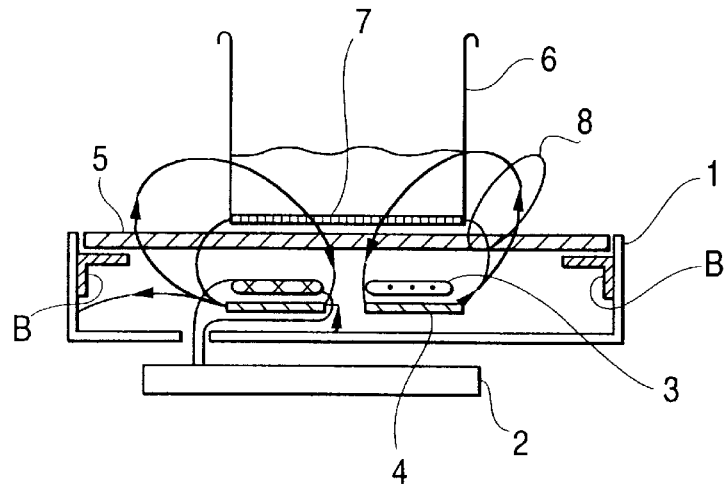
FIG. 1 shows the construction of an induction heating hotplate according to the state of the art.

In FIG. 1 is shown a vertical section through a high frequency hotplate for building-in with an encapsulation 1, a source of high frequency energy 2, a field coil 3, a magnetizable plate 4, a cover plate 5 on brackets B as a support for a cooking pot 6 with a magnetically conductive bottom 7. Furthermore the distribution of the field has been sketched by illustrating magnetic lines of force 8. It will be seen that there is considerable leakage radiation which causes part of the energy radiated by the coil 3 to be dispersed as eddy currents in the encapsulation 1 and to constitute closed lines of force which only run in air in the range surrounding the pot 6. In case the whole pot is magnetically well conducting most of the lines of force are absorbed by the vertical parts of the pot, but if it is made of copper with a view to better distribution of heat from the bottom, and this bottom is only supplied with a magnetically conductive and resistive inlay 7, a fairly large proportion of the magnetic energy will circulate in the air around the pot.

Figure 2:
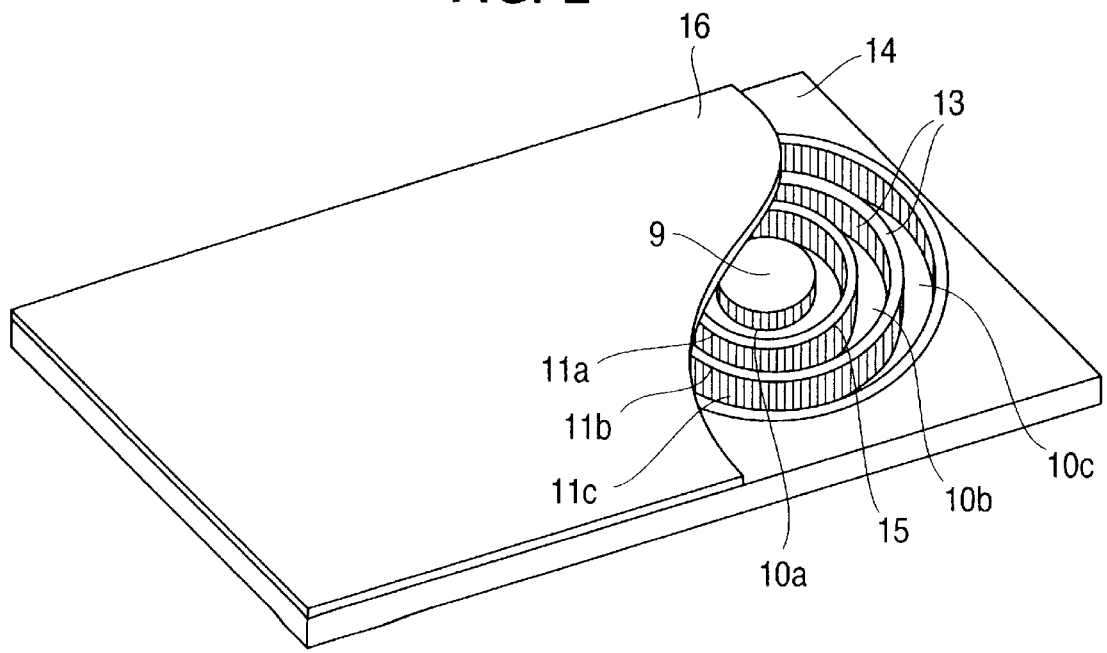
FIG. 2 shows the construction of a part of a transformer built into the hotplate according to the invention.

On FIG. 2 is seen a construction of an induction heating hotplate according to the invention in perspective view. In fact, two induction heating hotplates are shown assembled into one unit and one of them has part of the top layer removed in order that the structure as a transformer may be clearly seen. A central pole piece 9 is shown as well as ring-shaped chambers 10a, 10b, and 10c separated by ring-shaped pole pieces 11a and 11b, and with an outer ring-shaped pole piece 11c. In the ring-shaped chambers coils 12a, 12b, 12c are fitted, not shown in FIG. 2. They are shown in FIG. 3, and they are individually supplied with high frequency energy whereby different configurations are obtained for the field which is coupled to the transformer yoke in the form of the bottom 7 of the pot. The coil would be wound with litz wire which is particularly low-loss at the particular high frequency. A particularly simple series connection of all the coils is obtained by continuing the wire from one chamber to the next through slits 13 through the ring-shaped pole pieces as shown in FIG. 2. The close coupling obtained in the transformer in the described construction eliminates the problems of coupling between the coils in induction heating cookplates which are assembled close together.

The core of the transformer, i.e. all the magnetic parts, is made by casting a magnetic concrete material 15 in a negative mould. In the disclosed embodiment, the magnetic circuit is made up of magnetic concrete and the support or top layer 16 for the cooking vessel is cast-on of non-magnetic concrete, preferably of a DSP type. Such magnetic concrete materials are known from WO 92/08678 and comprise materials which as regards electric and magnetic properties are comparable to ferrites, but totally without their extremely small tensile-strength. The surround 14 for the magnetic circuit proper is cast in a non-magnetic DSP concrete. This material is characterized by its ability to be cast and large strength and is also described in WO 80/00959. Other materials having similar properties, i.e. electrical, mechanical, and thermic strength, may be used for the construction of induction heating hotplates according to the invention.

The construction according to the invention is hence well suited to being self-supporting apart from being able to tolerate the load from even large cast iron pots being put on the range without consideration for the support. The surface of these components will appear as a concrete material with magnetizable zones. However, there will be at least two reasons for finishing the construction with a top layer 16. First of all it would be inexpedient with regard to appearance as well as for reliability if the coils 12a, 12b, and 12c were accessible for damage, either mechanical or from drips from pots. Furthermore the pot bottom 7 which is heated by the energy transmission heats the magnetic core and the windings by conduction and hence shifts their operational conditions. For these reasons a covering layer 16 is cast on top of the coils and magnetic cores, and this constitutes the wear resistant surface. The coils are fixed in the ring-shaped chambers by having material cast around them and thereby the radiation of ultrasonic energy from the coils is completely eliminated, only a very unfortunate combination of frequency of operation and thickness of the induction heating element would radiate ultrasonic energy because of magnetostrictive effects but it is within the capability of the person skilled in the art to prevent such a condition from occuring.

Since the covering layer 16 as opposed to the top plate 5 is not supposed to carry any load in itself it may be quite thin and thereby a minimal airgap between the transformer 10, 11, 12 and its yoke 7 is obtained. The cover layer may furthermore be provided in the form of a thin sheet of alumina (aluminium oxide ceramic) which may be porous in order to obtain a particularly large thermic insulation. Such sheets are fragile on their own but sufficient strength is obtained by fitting them by casting through the binding to the strong support of the magnetic concrete and the surrounding DSP material.

Figure 3A:
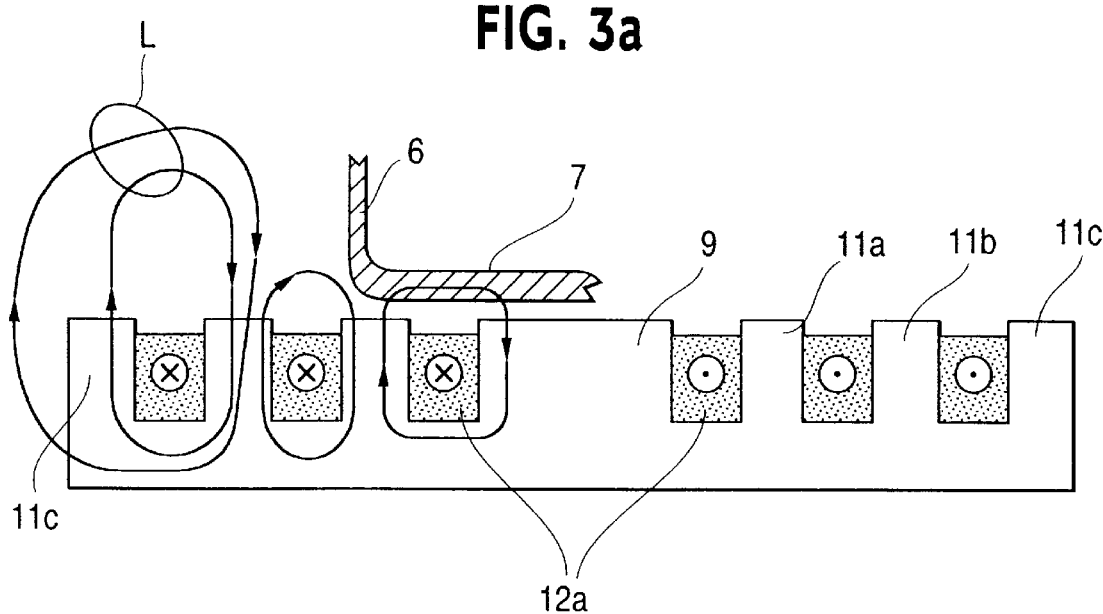
FIG. 3 shows different distributions of the magnetic lines of force according to the invention.
Figure 3B:
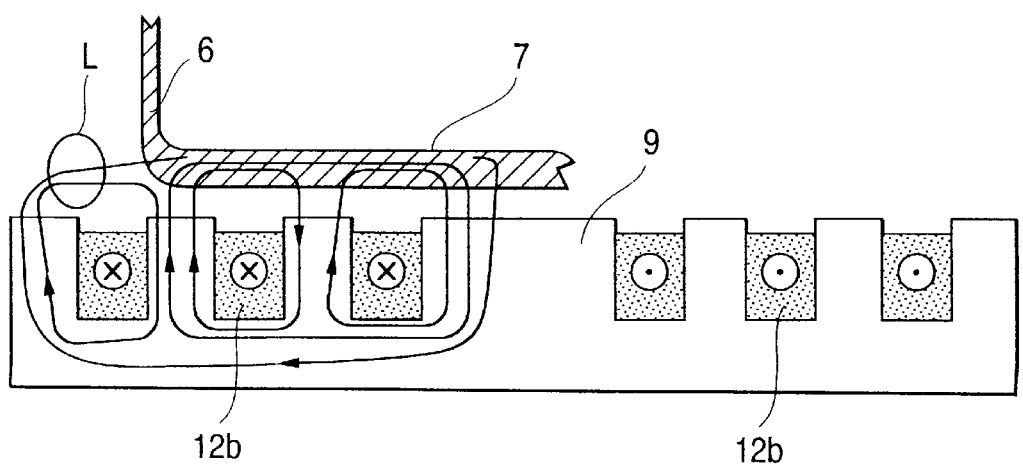
Figure 3C:
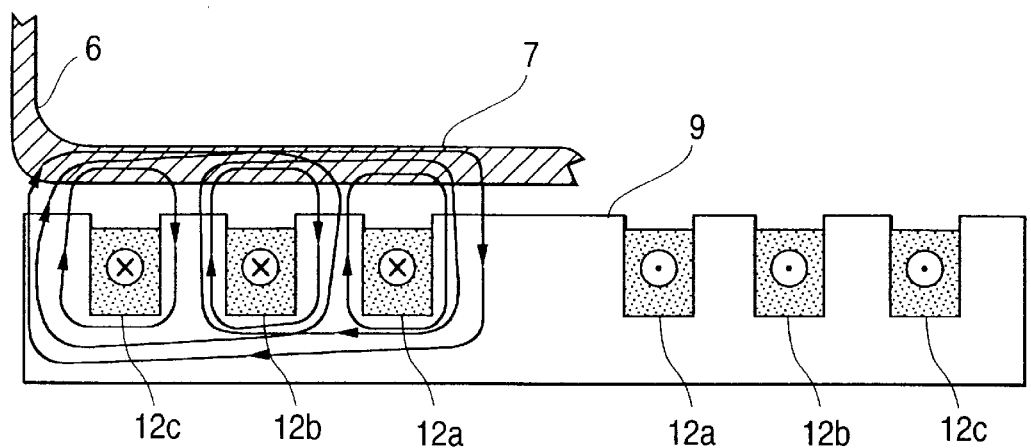

In FIG. 3 is shown a number of possibilities for the distribution of lines of force from the induction heating hotplate through pot bottoms 7 of various diameters. For reasons of simplicity only the case that all coils are active is shown while pots having different diameters are put onto them. In FIG. 3a is shown a small cooking pot on the induction heating hotplate and the leakage field shown by the lines of force L will be seen to be fairly large in a ring-shaped volume around the pot. It is quite obvious that a mode of operation of the transformer in which only the coil 12a is activated is the one to correspond to a small pot. In FIG. 3b a cooking pot of intermediate size is put on the induction heating hotplate, and it may be ascertained that the leakage field L is much smaller, but also in this case it would be more correct only to activate a part of the induction heating hotplate, namely both the coils 12a and 12b. In FIG. 3c a large pot is shown which corresponds to full activation of the coils 12a, 12b, and 12c. The leakage fields displayed will hence only be avoided by activating a number of coils which correspond to the diameter of the pot. Other combinations and polarity changes for the coils may be dealt with in an analogous fashion.

Figure 4:
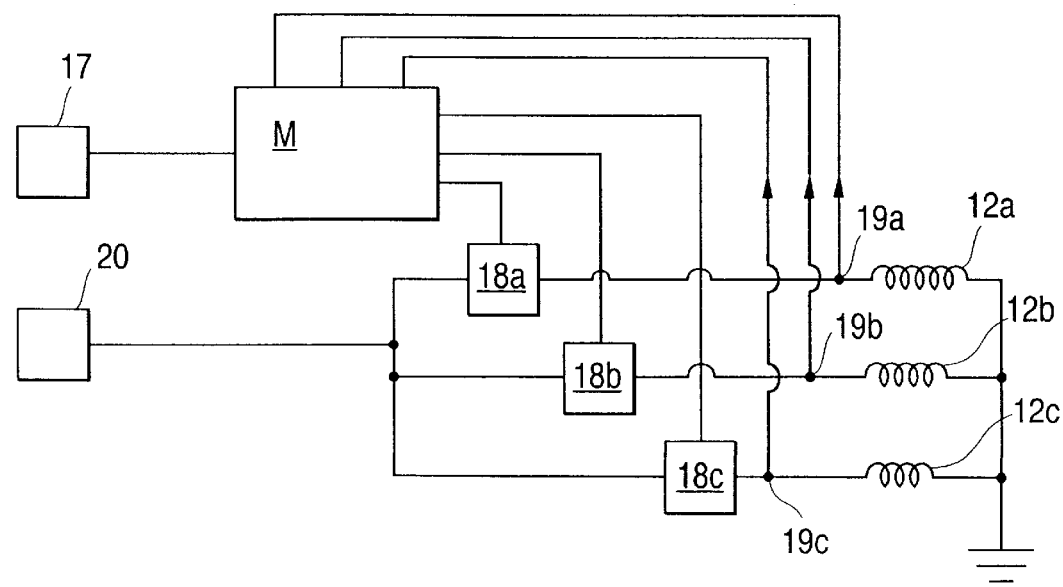
FIG. 4 shows a schematic of the principle for the construction of a hotplate with two modes of operation, one for measuring of impedance and one for the supply of high frequency energy.

In FIG. 4 is shown a circuit for automatically controlling the combination of coils as a function of the cooking pot put on the range. The placing of a pot changes the impedance in the transformer seen from the individual coil and the circuit performs a measuring cycle at low power and hence low radiation to the environment whereupon it switches to high power and to supply of those coils which will give the highest efficiency. The circuit may be built as shown in the figure in which a generator of a high frequency signal 20 is connected to individual amplifiers 18a, 18b and 18c, each connected to one of the coils 12a, 12b, and 12c. A timer 17 controls the measuring circuit to regulate the amplifiers to low power output while they are activated cyclically in order that at the measuring points 19a, 19b, and 19c one may measure values representing on the one hand the impedance in the coil. just activated, on the other hand signals in the other coils as an expression of the leakage. These values are tangible expressions for the coupling between the transformer and its yoke and give information about the size and placement of the pot 6 with the bottom 7 in relationship to the coils and hence the magnetically conductive elements 11a, 11b, and 11c. The values measured which in the present embodiment number 9 for each measuring cycle are compared in the measuring circuit M with stored empirical values and cause the relevant amplifiers to be regulated to a high power for supplying power to the pot. There is nothing to prevent the measurements at the points 19a, 19b, and 19c from being continued during the high power cycle as well, however the measuring circuit M must then furthermore contain suitable scaling and protective circuitry. Thereby the removal of a cooking pot would be immediately determined, and the power may reduced in consequence. In that case the timer 17 may be avoided because the stand-by condition may comprise an activity at a power which is just large enough to perform measurements. In this manner a completely self-controlled hotplate is obtained which in no way may constitute a radiation risk for the environment.

What is claimed is:

1. An apparatus for heating food by means of electromagnetic induction of eddy currents in a cooking vessel acting as a secondary coil in a transformer magnetic circuit, said apparatus comprising a source for high frequency energy, a primary coil, a magnetically conductive body and a support for the cooking vessel, wherein said transformer magnetic circuit formed by said magnetically conductive body and a cooking vessel on said support only has airgaps which are formed by a non-magnetic cover layer of said support disposed on said magnetically conductive body and said primary coil near the bottom of the cooking vessel acting as a yoke in the magnetic circuit.

2. An apparatus according to claim 1, wherein the magnetically conductive body of the magnetic circuit is constructed with a plate, and a central pole piece and an outer ring in the same level above the plate, which parts are made in a material having low magnetic losses or eddy current losses at the frequency utilized and wherein the coil is fitted into the ring-shaped space between the pole piece and the outer ring.

3. An apparatus according to claim 2, wherein one or several further rings made in the material having low magnetic losses or eddy current losses at the frequency utilized are fitted between the central pole piece and the outer ring and a coil is provided in each space between rings.

4. An apparatus according to claim 3, wherein the plate, the central pole piece, the rings and the outer ring are manufactured as an integrated block.

5. An apparatus according to claim 4, wherein each coil is cast into the winding space into which it is fitted.

6. An apparatus according to claim 4, wherein the integrated block is formed of a magnetic concrete material which does not deform when subjected to mechanical or thermic stress.

7. An apparatus according to claim 1, wherein the magnetically conductive body includes magnetic circuit elements made up of magnetic concrete and wherein said cover layer of said support for the cooking vessel is cast-on of non-magnetic concrete.

8. An apparatus according to claim 1, wherein the support for the cooking vessel has a low thermic conductivity.

9. A method of cooking using an apparatus for heating food by means of electromagnetic induction of eddy currents in a cooking vessel acting as a secondary coil in a transformer magnetic circuit, said apparatus comprising a source for high frequency energy, a primary coil, a magnetically conductive body and a support for the cooking vessel, wherein said transformer magnetic circuit formed by said magnetically conductive body and a cooking vessel on said support only has airgaps near the bottom of the cooking vessel acting as a yoke in the magnetic circuit, wherein the magnetically conductive body of the magnetic circuit is constructed with a plate, and a central pole piece and an outer ring in the same level above the plate, which parts are made in a material having low magnetic losses or eddy current losses at the frequency utilized and wherein the coil is fitted into the ring-shaped space between the pole piece and the outer ring, and wherein one or several further rings made in the material having low magnetic losses or eddy current losses at the frequency utilized are fitted between the central pole piece and the outer ring and a coil is provided in each space between rings, said method comprising combining the coils of said apparatus in a control circuit and utilizing said control circuit to supply energy to said coils in dependence on the diameter of the bottom of the cooking vessel.

10. A method of cooking according to claim 9, including operating said control circuit in a mode of operation for supplying power to a cooking vessel and in another mode of operation with reduced power supply to the coils for measuring the degree of coupling between the cooking vessel and the magnetic conductive body.

11. A method of cooking according to claim 10, including in the measuring mode of operation connecting the coils in rotation in different combinations, and providing an output signal which constitutes an expression of the impedance which is determined by the diameter and placement of the cooking pot for controlling the combination of coils which is to be supplied with energy from the source of high frequency energy in the subsequent power transfer.

* * * * *